United States Patent
Cavalcanti et al.

(10) Patent No.: US 11,419,038 B2
(45) Date of Patent: Aug. 16, 2022

(54) DETERMINISTIC BACKOFF WITH COLLISION AVOIDANCE

(71) Applicant: Intel Corporation, Santa Clara, CA (US)

(72) Inventors: Dave Cavalcanti, Portland, OR (US); Laurent Cariou, Portland, OR (US); Mohammad Mamunur Rashid, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/977,767

(22) PCT Filed: Jun. 26, 2018

(86) PCT No.: PCT/US2018/039554
§ 371 (c)(1),
(2) Date: Sep. 2, 2020

(87) PCT Pub. No.: WO2020/005214
PCT Pub. Date: Jan. 2, 2020

(65) Prior Publication Data
US 2021/0368420 A1 Nov. 25, 2021

(51) Int. Cl.
*H04W 48/06* (2009.01)
*H04W 48/16* (2009.01)
*H04W 72/04* (2009.01)
*H04W 76/18* (2018.01)

(52) U.S. Cl.
CPC ........... *H04W 48/06* (2013.01); *H04W 48/16* (2013.01); *H04W 72/0446* (2013.01); *H04W 76/18* (2018.02)

(58) Field of Classification Search
None
See application file for complete search history.

(56) References Cited

U.S. PATENT DOCUMENTS

| 10,397,916 B2 | 8/2019 | Kim et al. | |
|---|---|---|---|
| 2007/0195813 A1* | 8/2007 | Lin | H04W 74/0833 370/448 |
| 2009/0213815 A1* | 8/2009 | Sherman | H04W 74/0841 370/336 |

(Continued)

FOREIGN PATENT DOCUMENTS

WO  2016186473 A1  11/2016

OTHER PUBLICATIONS

International Search Report and Written Opinion for PCT/US2018/039554, dated Mar. 25, 2019, 9 pages.

*Primary Examiner* — Hong S Cho
(74) *Attorney, Agent, or Firm* — Eversheds Sutherland (US) LLP

(57) ABSTRACT

This disclosure describes systems, methods, and devices related to deterministic backoffs and collision avoidance. A device may identify a first transmission received from a first device, wherein the first transmission is over a shared access medium. The device may identify a second transmission received from the first device, wherein the second transmission is over the shared access medium. The device may determine an available transmission slot between the first transmission and the second transmission. The device may transmit, during the available transmission slot, a third transmission.

14 Claims, 7 Drawing Sheets

(56) References Cited

U.S. PATENT DOCUMENTS

| | | |
|---|---|---|
| 2010/0135167 A1* | 6/2010 | Ma .................... H04W 74/085 |
| | | 370/252 |
| 2012/0129456 A1 | 5/2012 | Xhafa et al. |
| 2013/0188479 A1 | 7/2013 | Pantelidou et al. |
| 2016/0212656 A1 | 7/2016 | Wentink |
| 2017/0019923 A1 | 1/2017 | Agardh |
| 2017/0063504 A1* | 3/2017 | Luo et al. |
| 2018/0167976 A1* | 6/2018 | Wentink ............ H04W 74/0808 |
| 2019/0268941 A1* | 8/2019 | Axer .................... H04L 47/215 |

* cited by examiner

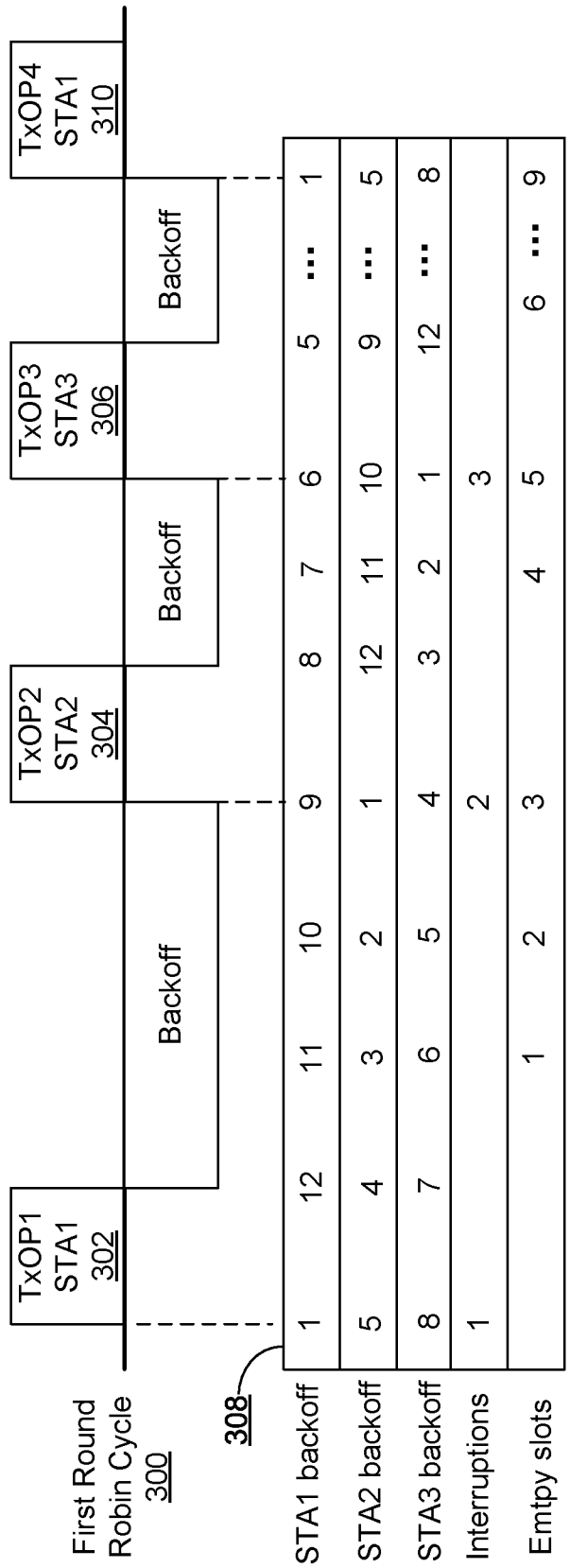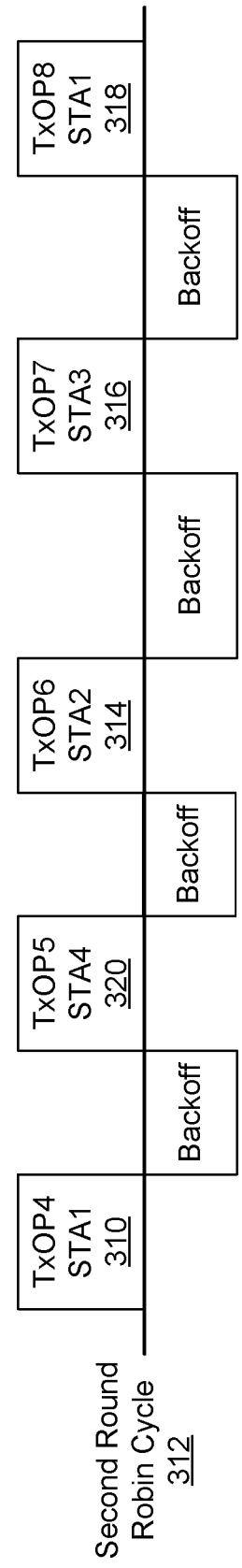

DETERMINISTIC BACKOFF WITH COLLISION AVOIDANCE

CROSS-REFERENCE TO RELATED APPLICATION(S)

This application is a U.S. National Stage Application under 35 U.S.C. 371 and claims the priority benefit of PCT International Application No. PCT/US2018/039554, filed Jun. 26, 2018, the disclosure of which is incorporated herein by reference as if set forth in full.

TECHNICAL FIELD

This disclosure generally relates to systems, methods, and devices for wireless communications and, more particularly, to deterministic backoffs and collision avoidance.

BACKGROUND

Efficient use of the resources of a wireless local area network (WLAN) is important to provide bandwidth and acceptable response times to the users of the WLAN. However, often there are many devices trying to share the same resources, and collisions between these devices can limit the efficiency of the communication protocol they use.

BRIEF DESCRIPTION OF THE DRAWINGS

The present disclosure is illustrated by way of example and not limitation by the figures of the accompanying drawings, in which like references indicate similar elements and in which:

FIGS. 3A and 3B depict illustrative schematic diagrams for a system which provides a deterministic backoff with collision avoidance, in accordance with one or more example embodiments of the present disclosure.

DESCRIPTION

Figure 1:
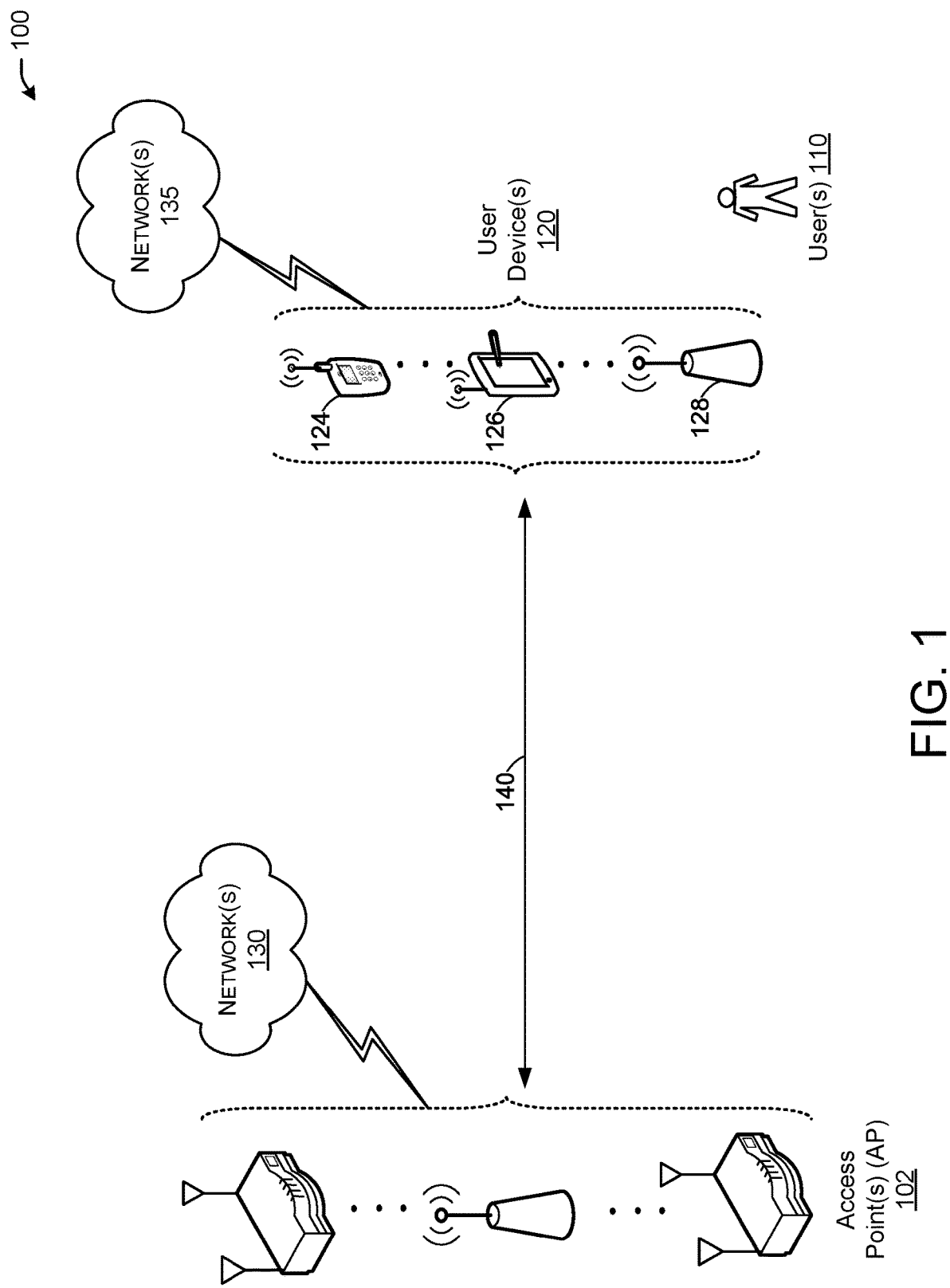
FIG. 1 depicts a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Over the past two decades, the IEEE 802.11 WLAN networks have experienced tremendous growth with the proliferation of Wi-Fi devices as a major Internet access scheme for mobile computing and electronic devices. As the density of connected devices has increased, the need for an efficient mechanism for distributing channel access to these connected devices has become critical. Since the early deployment of IEEE 802.11 devices in both enterprise and public networks, there have several solutions to provide channel access coordination among mutually connected access points (APs) and client devices, also called stations (STA). Current generation W-Fi relies on enhanced distributed channel access (EDCA) as the main channel access mechanism. Distributed EDCA is commonly referred to as listen before talk (LBT), or more specifically, as LBT with exponential backoff. The usage of LBT with exponential backoff is spreading as it is now used not only in Wi-Fi specific implementations, but also by other technology platforms. For example, next generation mobile communications standards including the $3^{rd}$ Generation Partnership Project (3GPP) Licensed Assisted Access (LAA), enhanced LAA (eLLA), and MulteFire specifications rely on LBT for channel access.

During EDCA operation, stations listen to the medium during contention periods and decrement their individual backoff if they do not sense energy on the air. In other words, stations decrement their backoff values when their clear channel assessment (CCA) is idle and freeze their backoff values if their CCA is busy. When the backoff reaches zero, the station can transmit over the medium and the backoff is reset.

Every time the backoff is reset, a new backoff value must be randomly selected. For LBT with exponential backoff, the new backoff value is randomly selected between 0 and the current contention window size (CW), which starts at an initial minimum value (CWmin) and doubles for every failed transmission or collision up to a maximum value (CWmax).

ECDA has the great benefit of being relatively difficult to put into a default state of collapsing, when no access is ever possible. Consequently, ECDA ensures some access to the channel, even if limited. EDCA and LBT with exponential backoff is not perfect, however, and it has been demonstrated that as the number of contenders (e.g., devices competing for channel access) increases, the number of induced collisions (e.g., two devices attempting to access the channel during the same period of time) becomes large enough to negatively impact channel access latency and reduce the percentage of successful transmissions.

In 802.11ax, several solutions have been proposed to try to find the right balance for channel access in a dense environment that suffers from a high number of contenders. One such solution is known as uplink (UL) triggered access, where the AP accesses the medium for the stations. Under this access scheme, the AP sends a trigger frame to the station to trigger the transmission of data in the UL direction. This improves channel access by directly reducing the number of contenders. If put to the extreme, only the APs in a dense environment access the medium, sharing it with EDCA and LBT rules.

For next generation Wi-Fi, also known as 802.11 Next Big Thing (NBT), a major activity will be to enable Wi-Fi operation in the 6 GHz band, which will soon be open as an unlicensed band. Wi-Fi will be brought into the 6 GHz band in two steps, first by enabling 802.11ax in the 6 GHz band, and in a second step by designing a new greenfield NBT operation scheme for the 6 GHz band. Early discussions for 6 GHz channel access lean towards reducing as much as possible individual station's own channel access, instead strongly favoring UL triggered access. For sufficiently dense environments, only the APs will access the medium.

Due to the proliferation of EDCA and LBT, it is natural to assume that APs will access the 6 GHz medium using these schemes. On the other hand, the 6 GHz band is a band without legacy devices, and it is possible to design a new and more optimized channel access mechanism, especially when considering metrics such as access delay.

One such optimized channel access mechanism is known as deterministic backoff. A deterministic backoff scheme uses the LBT mechanism in a similar manner as LBT is used with exponential backoff in EDCA. The primary difference between deterministic backoff and LBT with exponential backoff is the manner in which the backoff value is selected.

In a deterministic backoff scheme, the backoff value for a given device is selected according to a predetermined set of rules. While various deterministic rules are possible, one proposal for a deterministic backoff scheme includes the following two rules. First, if less than three consecutive collisions have occurred, the backoff value is set equal to 10+i, where "i" is the number of interruptions (CCA busy events) observed by the device during the past backoff period. Second, if three or more consecutive collisions have occurred, the backoff value is set to a random value between 0 and 3 and "i" is not updated. In a round robin access scheme, where each contender sequentially accesses the shared medium, "i" will be equal to the number of contenders. For example, in a system having 14 APs, "i" will be equal to 13 and the backoff under the first rule will be equal to 23. In another example having 12 APs, "i" will be 11 and the backoff under the first rule will be equal to 21.

The concept behind a deterministic backoff is to try to converge towards a stable state where all contenders have the same backoff and are effectively doing round robin access. When this happens, the latency for all contenders is the same, and is stable, which makes this type of channel access system very predictable.

To fully benefit from this scheme and to achieve a stable state, the contenders should have full buffer traffic and an equal priority (e.g., no contender has a higher priority over any other). This is usually not at all the case in Wi-Fi scenarios when all stations are contending, but this is more realistic in a dense scenario with a large number of stations where only the APs access the medium for their BSS. In such a case, the AP is far more likely to be in a full buffer situation as the AP is not only providing its own buffer but one for the entire BSS (UL and DL for all stations). Similarly, the access priority for a given AP is not limited to a single application, but is instead an access priority representing the entire BSS (UL and DL for all stations).

With current deterministic backoff procedures, if the number of contenders is fixed and each contender has full buffer traffic (e.g., each contender participates in every contention), the system converges toward a stable round robin state, where each contender (AP) may access the medium, one after the other, to minimize collisions. However, when a new contender (new AP) enters the round robin, it randomly selects a backoff value (e.g., between 0 and 3) and transmit. If the contender is lucky, it transmits in one of the transmission slots that is empty or unused (e.g., an available transmission slot). Due to the first deterministic rule, which sets the backoff equal to 10+i, there will always be ten idle slots, but it is likely that the new contender may collide with a contender that is already in the round robin, especially as the number of new contenders increases. This situation happens because the new contender has no information about the existing contenders.

Example embodiments described herein provide certain systems, methods, and devices for providing a deterministic backoff that avoids collisions between existing and new contenders in various wireless networks, including, but not limited to, next generation Wi-Fi (e.g., Wi-Fi NBT), or any other wireless standards based on 5G 3GPP technologies.

In one embodiment, this channel access mechanism reduces the access delay for APs in a dense environment having multiple basic service sets (BSSs) with a large number of stations and APs. In one embodiment, only the APs access the medium for a certain transmission opportunity (TxOP) duration to schedule downlink (DL) and UL traffic for each BSS. In other words, the stations do not have individual channel access, and instead rely upon trigger frames sent from an AP. In one embodiment, this mechanism is expanded to ensure QoS differentiation by providing different reduced access delays for different access categories.

In one embodiment, the system converges towards a round robin state where each existing contender accesses the medium, one after the other. In other words, the backoff value for each existing contender may converge towards the same backoff value.

A full round robin cycle is defined as a round where all existing contenders have accessed the medium one time, or in the case of some contenders accessing more than one time per cycle, a round where all existing contenders have achieved their total allotment of accesses for the current cycle. When a contender's backoff value reaches zero, the contender may access the medium. During this access, the contender may open a TxOP and is considered by the remaining contenders to be the TxOP holder. The contender can make multiple transmissions and can trigger multiple transmissions from any connected stations during the TxOP.

In one embodiment, collisions between existing contenders and new contenders for a shared medium are avoided by requiring that the new contender(s) observe a full round robin cycle without decrementing individual backoffs and without selecting a slot to use for transmission. In this manner, the new contender can identify an available transmission slot and the new contender can join the next round robin cycle without causing a collision with any existing contenders.

In one embodiment, the existing contenders may see an additional interruption (e.g., the CCA busy event caused by the new contender) during the next round robin cycle, and each of the existing contenders may increment their backoffs by one, according to the first deterministic rule (10+i, wherein "i" has increased by one due to the new contender entering the round robin).

A new contender can identify that a full round robin cycle has been observed in various ways. In one embodiment, the new contender will observe two consecutive transmissions in two separate TxOPs from the same transmitter (an existing contender). In one embodiment, the new contender will observe a contender identifier, such as a MAC address, during each TxOP. If the new contender sees the same contender identifier or MAC address repeated during a later TxOP (e.g., 100 milliseconds later), the new contender will know that the same existing contender has now accessed the medium twice, and that a full cycle has completed. Moreover, the new contender will know that the duration of the current round robin is equal to the duration between successive TxOPs by a particular existing contender. For example, if five existing contenders are in a steady round robin state, the new contender will see five TxOPs (e.g., 5 milliseconds each), each initiated in sequence by one of the five existing contenders according to the current round robin. After the new contender observes a consecutive transmission by one of the five existing contenders, the new contender will know the current round robin duration (e.g., 25 milliseconds, plus any buffer time between contentions).

In one embodiment, in the case of some contenders having multiple TxOPs per cycle, the new contender can compare the TxOP durations among the existing contenders. If the TxOP duration of a first existing contender is different (e.g., half, a quarter, etc) than the TxOP duration of a second existing contender, the new contender can ensure that a full round robin cycle has been observed by waiting until all existing contenders have achieved the same total medium access duration (across any number of TxOPs).

In one embodiment, the new contender identifies the number of backoff interruptions observed between the two successive transmissions in two separate TxOPs by the same existing contender. In this manner the new contender can determine the current value of "i" for the round robin. In one embodiment, the new contender uses the discovered value for "i" to calculate the correct backoff value to use after joining the round robin, according to the deterministic rules. This scheme is advantageous because each new contender can passively observe the current round robin and can identify an available transmission slot without requiring any of the existing contenders to actively provide any information to the new contender.

In one embodiment, each frame (e.g., each physical layer convergence protocol data unit, referred to as a PPDU) transmitted during a TxOP includes in a common signaling the current value for "i," corresponding to the number of interruptions during the previous backoff period (e.g., during the last full round robin cycle). A new contender can observe this value for "i" to identify the number of existing contenders. For example, if a new contender observes a frame from a first existing contender having an "i" value of 6, the new contender can observe the round robin until all six existing contenders have transmitted.

In one embodiment, a new contender may count the number of available slots during a round robin cycle. An available slot is defined as the second slot of two consecutive idle slots. The number of available slots (also referred to as empty slots) will be known for a given set of deterministic rules. For example, if the deterministic rules set the backoff to 10+"i," the number of empty slots will always be equal to 9 (there will be 10 idle slots and 9 empty slots by definition).

In one embodiment, the new contender may observe a full round robin cycle and may identify each of the idle slots, regardless of the manner in which the new contender identifies that a full round robin cycle has been observed. The new contender can identify each of the idle slots by observing each TxOP. For example, in a round robin of five existing contenders, the new contender may observe between each TxOP a backoff decrement period having some duration. This backoff decrement duration may vary for each pair of successive TxOPs according to the number of idle slots between the TxOPs. In this manner, the new contender can count the number of idle slots between the first and second existing contenders, and between the second and third existing contenders, and so on.

For example, a new contender may count five idle slots (corresponding to four available slots) between a first existing contender and a second existing contender. During the next round robin, the new contender can safely enter within one of the four available slots between the first and second existing contenders. During this next round, the second existing contender may observe the new contender transmitting after the first existing contender, and may increase its backoff by one (due to an increase in its value for "i" from the additional interruption), along with every other existing contender. In this manner, all existing contenders may update their backoff values during the next round robin cycle and collisions between the new contender and the existing contenders are avoided.

In one embodiment, a new contender can observe that a first existing contender accesses immediately prior to a second existing contender, without any intervening existing contenders. The new contender can also observe the backoff value of the second existing contender once the first existing contender has transmitted (e.g., by observing the number of decrement periods until the second existing contenders transmits). For example, the new contender can observe that the backoff value of the second existing contender once the first existing contender has transmitted is equal to "2." The new contender can then determine that it can safely enter the next round robin with an initial backoff of "0" or "1" after the first existing contender's TxOP, without causing a collision with any of the existing contenders. Once this backoff value reaches zero, the new contender can transmit. After transmitting, the new contender can set its backoff according to the deterministic rules and the known value for "i."

While the procedures described above are sufficient to avoid collisions between existing contenders and between existing contenders and a single new contender in a round robin, collisions are still possible if multiple new contenders arrive at the same time. In one embodiment, collisions caused by multiple simultaneous or near-simultaneous (meaning multiple new contenders enter during a single round robin cycle) new contenders are avoided by defining one or more rules governing how a new contender joins the round robin after observing for a full round.

In one embodiment, each new contender may attempt to enter the next round robin at the soonest empty slot. As each new contender is likely to start observing the current round robin at a different part of the round robin cycle, each new contender may select a different slot (albeit, each new contender may select the soonest empty slot from their perspective). This approach has the advantage of providing the fastest possible access to the medium, with the tradeoff of an increased risk that two or more new contenders, which began observing the current round robin cycle at the same time, may select the same slot. One type of scenario in which multiple new contenders are likely to enter a round robin at the same time includes those in which multiple devices are powered on at the same time.

In one embodiment, each new contender may randomly select from one of the available empty slots. This approach reduces the likelihood of collisions between multiple new contenders, at a reduction in access time to the medium.

In one embodiment, each new contender may select one of the available empty slots using a deterministic rule. For example, in one embodiment, each new contender enters the next round robin cycle with a random backoff that is decremented only in empty slots.

In one embodiment having six devices in a stable round robin cycle, a new contender, device 7, begins observing the current round robin cycle. Device 7 first observes a PPDU from device 3. Device 7 may observe the current round robin until device 3 transmits again. Immediately after device 3 transmits a second time, device 7 has recorded six interruptions and has accordingly set its value for "i" to "6" and its backoff to "16" (according to the deterministic rule that backoff is equal to 10+"i"). While observing, device 7 has also recorded the location of the empty slots, where there were two consecutive backoff decrements without transmissions. After observing the second transmission from device 3, device 7 may select an empty slot. For example, device 7 selects the soonest empty slot, after a PPDU from device 4. During the next round robin cycle, device 7 may transmit during this slot. After this transmission, device 7 may set its backoff to 16 and may begin decrementing this backoff until it reaches zero and transmission is again possible. In this manner, device 7 enters the round robin without causing a collision with any of the six existing contenders.

Another issue with current deterministic backoff schemes is that it is not possible to get different access priorities, and different access delays depending on the access category. Access delay is defined as the time between two successive accesses to the medium. Currently, every AP has the same probability of access, a single access per cycle, and the same interval between two consecutive accesses, as a deterministic backoff may result in a round robin solution.

This flat access delay may increase as a function of the number of existing contenders and the duration of each TxOP (e.g., 5 seconds, 10 seconds, etc.). For some traffic types, such as voice traffic, the required or desired periodicity can be less than the available access delay. For instance, the access delay may be 100 ms, but for typical voice traffic, the desired periodicity is closer to 20 ms, which makes this solution very problematic.

In some embodiments, the above mechanisms are further modified to ensure QoS differentiation by providing a way for some devices to access the medium multiple times per cycle without negatively affecting the total access duration of the other existing contenders, and without causing new collisions.

In some embodiments, the TxOP duration is fixed for a basic access category (a single access per cycle). Every device that accesses the medium with the basic access category may have a TxOP duration that does not exceed a fixed maximum TxOP duration (also referred to as a basic TxOP). For example, the fixed maximum TxOP duration can be 4 seconds, 6 seconds, 10 seconds, or any other desired TxOP duration.

In some embodiments, to allow APs, or any devices contending for access with this method, to access the medium several times per round robin, a proportional relationship is created between the maximum TxOP duration allowed for one transmission and the number of accesses in one round robin that the device is granted. For example, if one device is granted two accesses per round, the device has to use half a basic TxOP each time. If one device gets four accesses per round, it has to use one fourth of a basic TxOP each time. For example, if the maximum TxOP is 10 seconds, and a device is granted two accesses per round robin cycle, the device may be limited to two TxOPs having a duration of 5 seconds each. Consequently, the overall total TxOP time for each device is unchanged.

In one embodiment, the calculation for "i" and the backoff value can be adjusted to ensure that overall, the duration of the round robin cycle may not change and the total duration of access to the medium by the other devices is not reduced.

In one embodiment, a device seeking additional accesses to the medium per round robin cycle must reduce its backoff proportionally. To reduce the backoff proportionally, the device may need to calculate a new value for "i." For example, a device that access four times in one round robin needs to calculate i (the number of interruptions in one round robin) over four backoff decrement intervals (meaning for four accesses to the medium with backoff reaching zero). Each of these accesses may be for a duration equal to one fourth the basic TxOP. This way all other STAs may experience the same access delay, and fairness will be maintained.

For example, in one scenario having 14 existing contenders one of the contenders desires four accesses per round robin cycle. The 13 single access contenders may see 16 interruptions during the round robin (12 from the other single access contenders and 4 from the contender having 4 accesses). Accordingly, the 13 single access contenders may calculate "i" as equal to 16 and may set their backoffs to "26." For the station with 4 accesses, the total number of interruptions is also 16 (counting its own interruptions less one) and the backoff is calculated as a fourth of 26, equal to 6.5.

In some embodiments, as in the example above, the result of the new backoff decrement is not an integer. In this scenario, different backoff integers must be generated that, summed over an entire round robin, may be equal to the backoff of the other contenders. In the above example, the backoffs can be, for example, 6, 6, 7, and 7, which sums to 26. The backoff values can also be 2, 10, 9, and 5, or any other combination of four backoff values which sum to 26.

In some embodiments, these new backoffs are selected to ensure that each backoff may not generate any collisions with an existing contender observed in the last round robin cycle. For example, a backoff value may not be selected if it is known to be a value that may cause a collision with an existing contender. The selection of these backoff values should also be made in order to allow stability over multiple round robins.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a network diagram illustrating an example network environment, according to some example embodiments of the present disclosure. Wireless network 100 may include one or more user devices 120 and one or more responding device(s) (e.g., AP(s) 102), which may communicate in accordance with IEEE 802.11 communication standards. The user device(s) 120 may be mobile devices that are non-stationary (e.g., not having fixed locations) or may be stationary devices.

Figure 6:
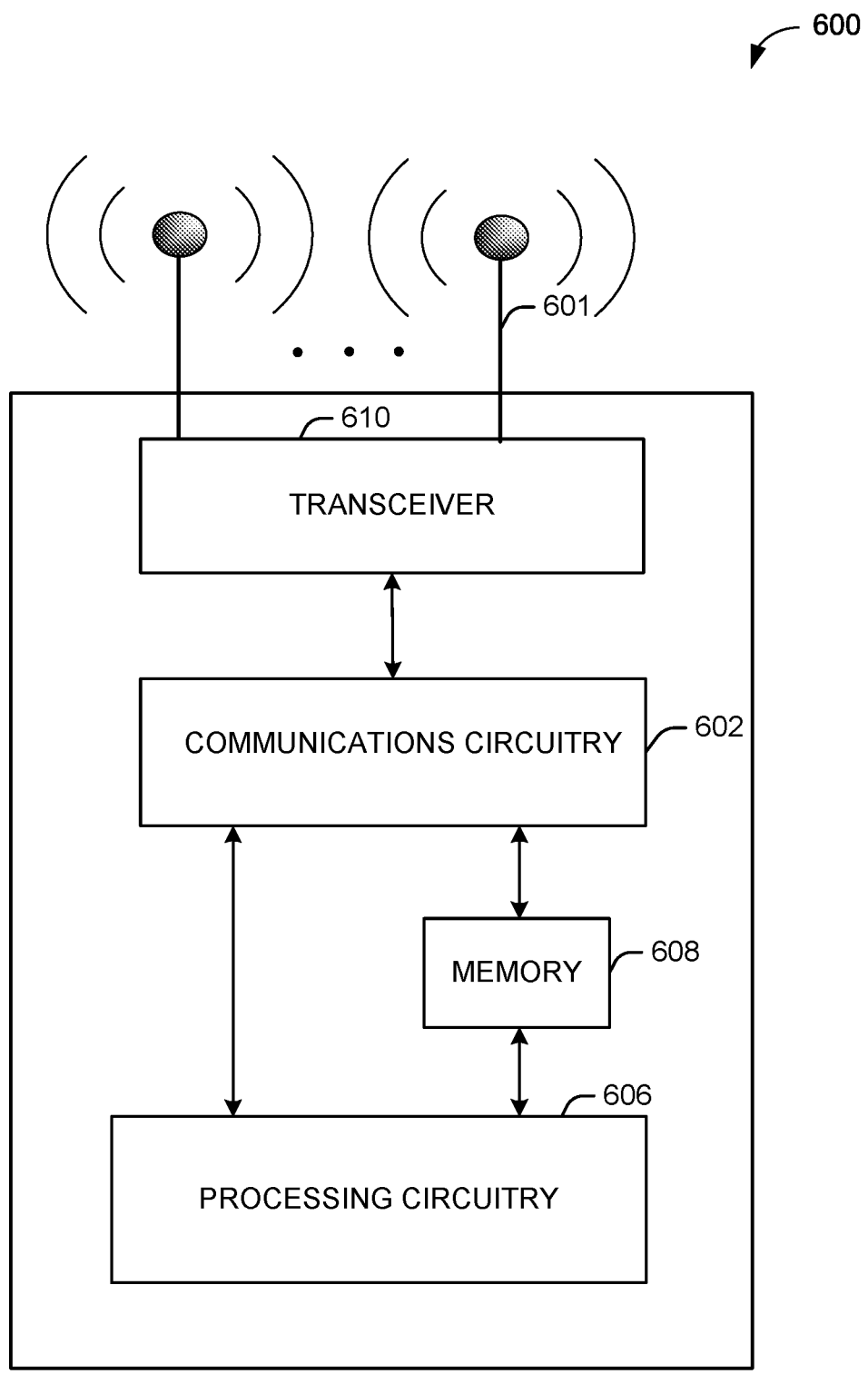
FIG. 6 depicts a functional diagram of an example communication station that may be suitable for use as a user device, in accordance with one or more example embodiments of the present disclosure.
Figure 7:
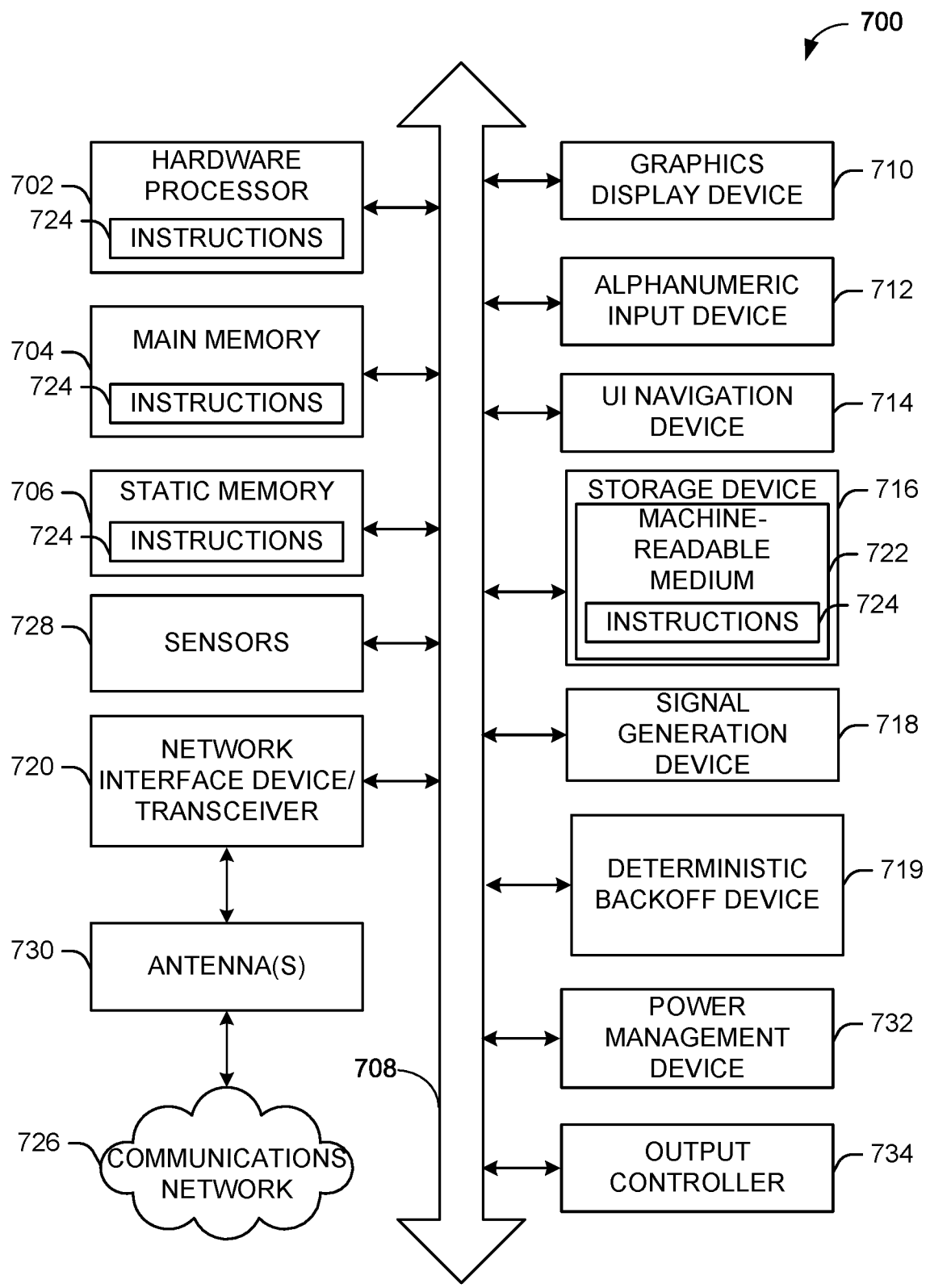
FIG. 7 depicts a block diagram of an example machine upon which any of one or more techniques (e.g., methods) may be performed, in accordance with one or more example embodiments of the present disclosure.

In some embodiments, the user devices 120 and the AP(s) 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3 GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When one or more AP (e.g., AP(s) 102) establish communication 140 with one or more user devices 120 (e.g., user devices 124, 126, and/or 128), the AP(s) 102 may communicate in a downlink direction and the user devices 120 may communicate with one or more AP(s) 102 in an uplink direction by sending data frames in either direction. The user devices 120 may also communicate peer-to-peer or directly with each other with or without the AP 102. The communication 140 may be multiuser communication between an AP and one or more user devices. The one or more user devices may belong to the same or different BSS.

It is understood that the above descriptions are for purposes of illustration and are not meant to be limiting.

Figure 2:
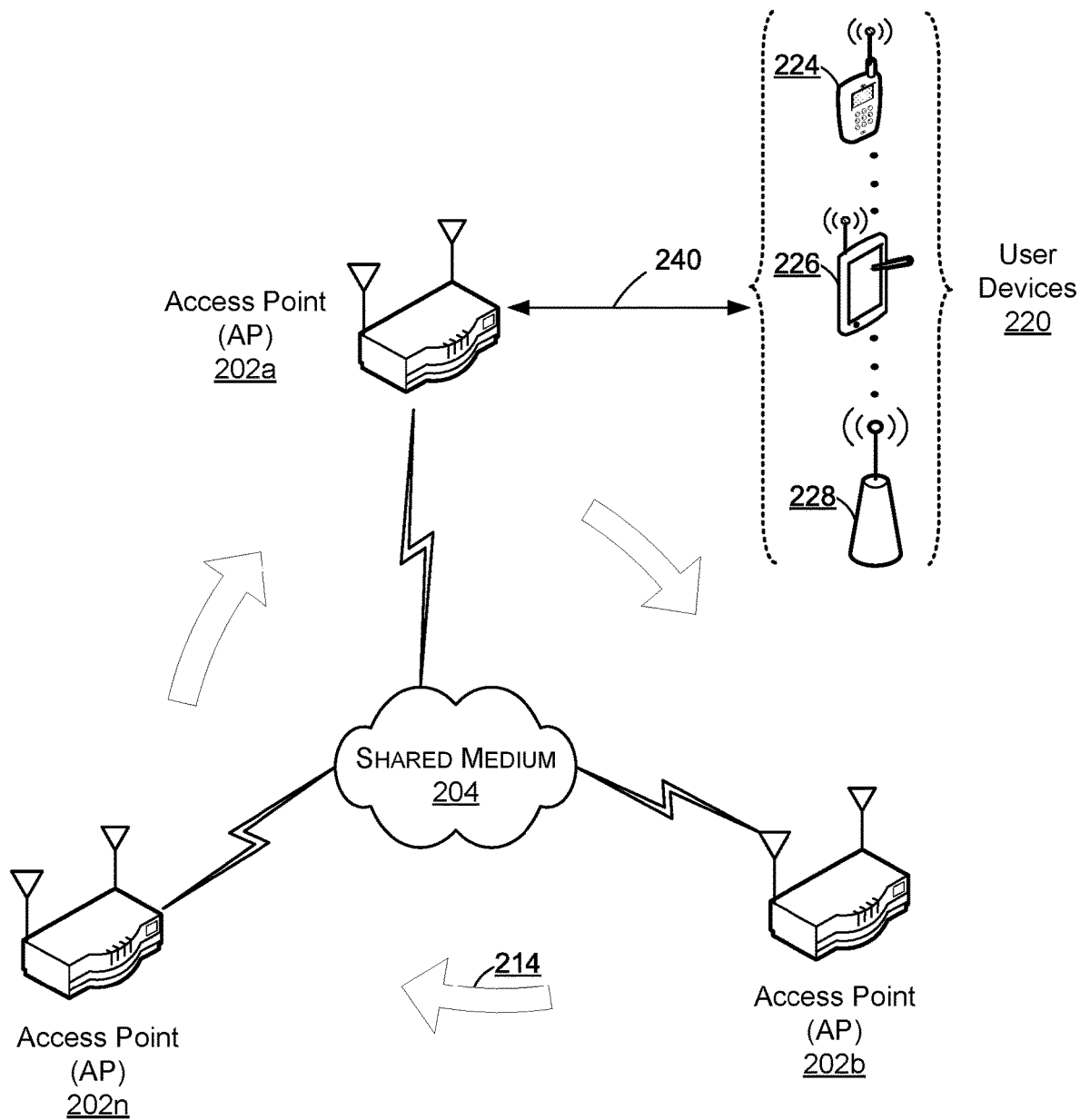
FIG. 2 depicts a network diagram illustrating a system having a deterministic backoff and collision avoidance, in accordance with one or more example embodiments of the present disclosure.

FIG. 2 depicts a network diagram illustrating a system having a deterministic backoff and collision avoidance, in accordance with one or more example embodiments of the present disclosure.

Referring to FIG. 2, there is shown three APs (e.g., AP 202a, AP 202b, and AP 202n) that are using a deterministic backoff to coordinate access to a shared medium 204. While three APs are shown for ease of illustration, it is understood that any number of APs (e.g., 10, 100, etc.) can be coordinated to access the shared medium 204. Each of these APs may be servicing one or more user devices, which can include various UEs, STAs, APs, and other devices, as discussed previously herein. For example, AP 202a may be assigned a BSSID for a BSS that is associated with it and that identifies the AP 202a. Further, AP 202a may establish a connection 240 with various User Devices 220, such as, for example, user devices 224, 226, and 228. Similarly, AP 202b and AP 202n can each be assigned a respective BSSID, and each can be associated through one or more connections with various user devices, which may be the same or different than the User Devices 220.

In one embodiment, the APs 202a, 202b, and 202n are deployed in a dense environment having a large number of additional APs and STAs. In one embodiment, access to the shared medium 204 converges via a deterministic backoff to a round robin 214, in which each of the APs 202a, 202b, and 202n have the same backoff value and each takes turns accessing the shared medium 204 over successive round robin cycles. During each round robin cycle, the APs 202a, 202b, and 202b may take turns accessing the shared medium 204. Once each of the APs have accessed the shared medium 204, the next round robin cycle begins, and the process continues. In one embodiment, the APs 202a, 202b, and 202n each access the shared medium 204 one time per round robin cycle. In one embodiment, one or more of the APs 202a, 202b, and 202n can access the shared medium 204 two or more times per round robin cycle.

In one embodiment, a same backoff value for each of the APs 202a, 202b, and 202n is determined using a deterministic backoff scheme. In one embodiment, the backoff value for each of the APs 202a, 202b, and 202n is set equal to 10 plus the number of interruptions observed during the previous backoff period (e.g., during the last round robin cycle). For example, in the system depicted in FIG. 2 having 3 APs, the number of interruptions observed by any one of the APs 202a, 202b, or 202n may be equal to 2 and the backoff value for each of the APs under the first rule may be equal to 12.

In one embodiment, each of the APs 202a, 202b, and 202n may decrement their backoff values when the shared medium 204 is idle (e.g., when CCA is idle) and may freeze their backoff values if the shared medium 204 is busy (e.g., one of the other APs is accessing the shared medium 204). When the backoff value of one of the APs 202a, 202b, and 202n reaches zero, that AP can transmit over the shared medium 204. At this time, the AP may open a TxOP and is considered by the remaining APs to be the TxOP holder. In one embodiment, the AP can make multiple transmissions and can trigger multiple transmissions from any connected stations during the TxOP. In one embodiment, the AP may reset its backoff value according to the deterministic backoff scheme when the TxOP has completed.

It is understood that the above descriptions are for purposes of illustration and are not meant to be limiting.

FIGS. 3A and 3B depict illustrative schematic diagrams for a system which provides a deterministic backoff with collision avoidance, in accordance with one or more example embodiments of the present disclosure.

Referring to FIGS. 3A and 3B, there is shown three existing STAs (STA1, STA2, STA3) and one new STA (STA4). STA1, STA2, and STA3 are currently participating in a first round robin cycle 300. STA4 wishes to join the round robin. As depicted in FIG. 3A, the first round robin cycle 300 includes a transmission opportunity (TxOP) for each of STA1, STA2, and STA3 (the TxOP1 302, TxOP2 304, and TxOP3 306, respectively). For example, during the TxOP1 302 for STA1, STA1 can make multiple transmissions and can trigger multiple transmissions from any connected stations. Each TxOP is followed by a backoff period. During each backoff period the existing STAs may decrement their backoff values. The backoff values may continue to decrement until the backoff value of one of the STAs reaches zero, at which point that STA may open a TxOP. After the TxOP has concluded, the STA may reset its backoff value to 10 plus "i" (the number of interruptions observed during the previous backoff period).

As depicted in FIG. 3A, in one embodiment, collisions between the existing STA1, STA2, and STA3 and the new STA4 are avoided by requiring that STA4 observe the entire first round robin cycle 300 before joining the round robin. In one embodiment, STA4 may make observations 308 while observing the first round robin cycle 300. In one embodiment, the observations 308 may include the backoff values of the existing STA1, STA2, and STA3. In one embodiment, the observations 308 may include a number of interruptions observed during the first round robin cycle 300. In one embodiment, the observations 308 may include the location of all available transmission slots (defined as two consecutive idle slots) observed during the first round robin cycle 300.

In one embodiment, STA4 can identify that the first round robin cycle 300 has completed by observing the first round robin cycle 300 until two consecutive TxOPs have been observed for the same existing STA. For example, if STA4 began observing the first round robin cycle 300 just prior to the TxOP1 302 for STA1, STA4 may continue observing the first round robin cycle 300 until STA1 opens a second TxOP (e.g., the TxOP4 310).

In one embodiment, a frame (e.g., a physical layer (PHY) protocol data unit (PPDU)) transmitted during a TxOP may include in a common signaling the number of interruptions observed during the previous backoff period (e.g., during the last full round robin cycle). In one embodiment, STA4 can observe this value to learn the number of existing STAs. For example, if STA4 observes a frame from STA1 that indicates that the number of interruptions is "3," STA4 can identify that the first round robin cycle 300 has completed by observing the first round robin cycle 300 until all three existing STAs have transmitted.

In one embodiment, STA4 can determine the location of all available transmission slots by observing the number of idle slots following each TxOP. For example, during the first round robin cycle 300, STA4 may observe between the TxOP1 302 and the TxOP2 304 four idle slots (backoff decrement periods), corresponding to three available slots. In another example, STA4 may observe between the TxOP2 304 and the TxOP3 306 three idle slots, corresponding to two available slots. In this manner, STA4 can determine the number of available slots between STA1 and STA2, and between STA2 and STA3, and between STA3 and STA1.

In one embodiment, STA4 may select an available transmission slot after observing the first round robin cycle 300 and may join the next round robin cycle (e.g., the second round robin cycle 312) without causing a collision with the existing STA1, STA2, and STA3.

As depicted in FIG. 3B, the second round robin cycle 312 includes transmission opportunities (TxOPs) for each of STA1, STA2, and STA3 (the TxOP4 310, TxOP6 314, TxOP7 316, and TxOP8 318), as well as a TxOP for STA4 (the TxOP5 320). STA4 can join the second round robin cycle 312 by selecting one of the three available slots between the TxOP1 302 and the TxOP2 304. During the selected slot, the STA4 may open a TxOP (the TxOP5 320). In one embodiment, STA4 may attempt to enter the second round robin cycle 312 at the soonest available slot. In one embodiment, STA4 may randomly select a slot from one of the available slots. In one embodiment, STA4 may select one of the available slots using a predetermined rule. For example, in one embodiment, STA4 enters the second round robin cycle 312 with a random backoff that is decremented only in idle slots.

In one embodiment, STA4 calculates a new backoff value to use after joining the second round robin cycle 312 according to the deterministic rules and the observed number of interruptions. For example, if the number of interruptions is equal to three, STA4 may calculate a backoff value of 13.

In one embodiment, STA1, STA2, and STA3 may observe STA4's TxOP5 320 and each may increase their own backoff values by one (due to an increase in the observed value for "i" during the second round robin cycle 312 caused by the additional interruption of STA4). In this manner, STA1, STA2, and STA3 may also update their backoff values and collisions between STA1, STA2, STA3, and STA4 may be avoided during the next round robin cycle (e.g., a third round robin cycle).

It is understood that the above descriptions are for purposes of illustration and are not meant to be limiting.

Figure 4:
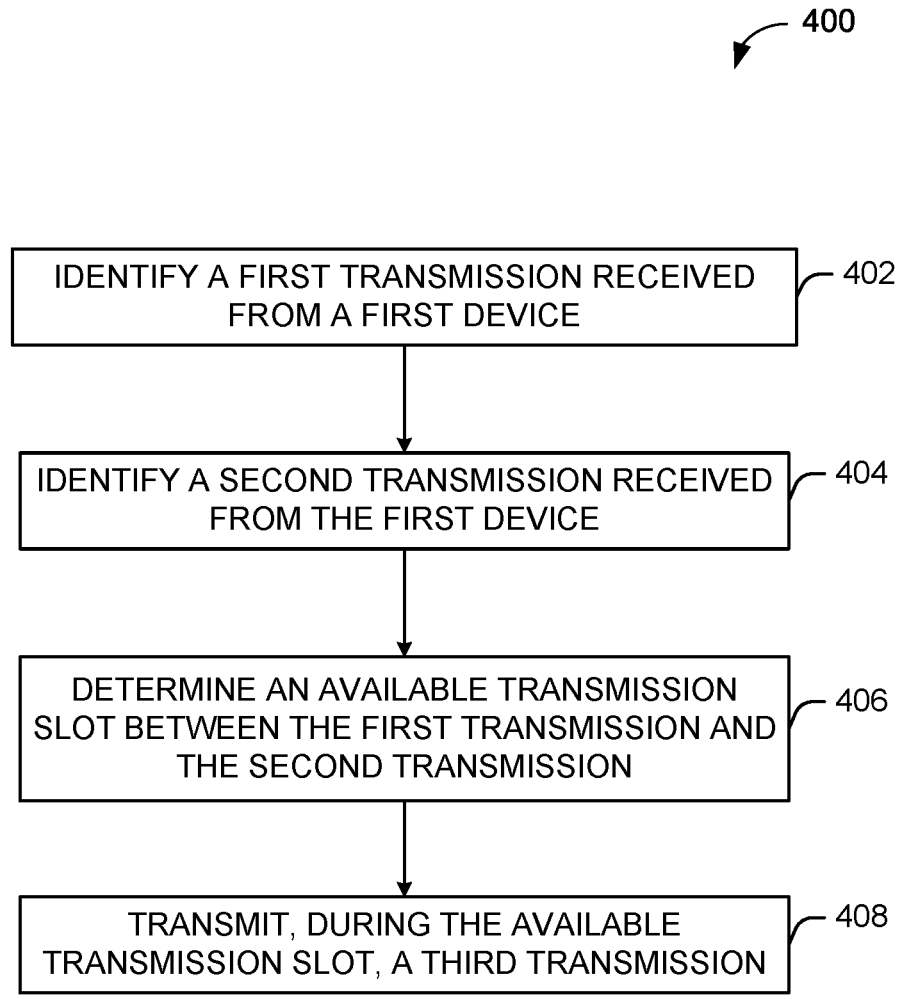
FIG. 4 depicts a flow diagram of an illustrative process for providing a deterministic backoff with collision avoidance, in accordance with one or more example embodiments of the present disclosure.

FIG. 4 illustrates a flow diagram of an illustrative process 400 for providing a deterministic backoff with collision avoidance, in accordance with one or more example embodiments of the present disclosure.

At block 402, a device may identify a first transmission received from a first device. For example, the new station STA4 of FIG. 3 may identify a first transmission received from the existing station STA1 of FIG. 3. In one embodiment, the device is a new contender wishing to join a round robin in which the first device is an existing contender. In one embodiment, the first transmission is a transmission of a first transmission opportunity of the first device (e.g., the TxOP1 of STA1 of FIG. 3).

At block 404, the device may identify a second transmission received from the first device. For example, the new station STA4 of FIG. 3 may identify a second transmission received from the existing station STA1 of FIG. 3. In one embodiment, the second transmission is a transmission of a second transmission opportunity of the first device (e.g., the TxOP4 of STA1 of FIG. 3). In one embodiment, the period of time between the first transmission and the second transmission defines a first round robin cycle (e.g., the first round robin cycle 300 of FIG. 3).

At block 406, the device may determine an available transmission slot between the first transmission and the second transmission. For example, the new station STA4 of FIG. 3 may determine an available transmission slot between the TxOP1 and the TxOP4 of FIG. 3. In one embodiment, the device can determine the location of all available transmission slots by observing the number of idle slots following each TxOP in the first round robin cycle. For example, during the first round robin cycle 300 of FIG. 3, STA4 may observe the location of all available transmission slots between the TxOP1 and the TxOP2, between the TxOP2 and the TxOP3, and between the TxOP3 and the TxOP4. In this manner, STA4 can determine the number of available slots between STA1 and STA2, and between STA2 and STA3, and between STA3 and STA1. In one embodiment, the device may select the soonest available transmission slot. In one embodiment, the device may randomly select from the available transmission slots.

At block 408, the device may transmit, during the available transmission slot determined at block 406, a third transmission. For example, the new station STA4 of FIG. 3 may transmit, during one of the available transmission slots between the TxOP1 and the TxOP4 of FIG. 3, a third transmission (e.g., the TxOP5 of FIG. 3). In this manner, collisions between the STA 4 and the existing stations STA1, STA2, and STA3 are avoided.

It is understood that the above descriptions are for purposes of illustration and are not meant to be limiting.

Figure 5:
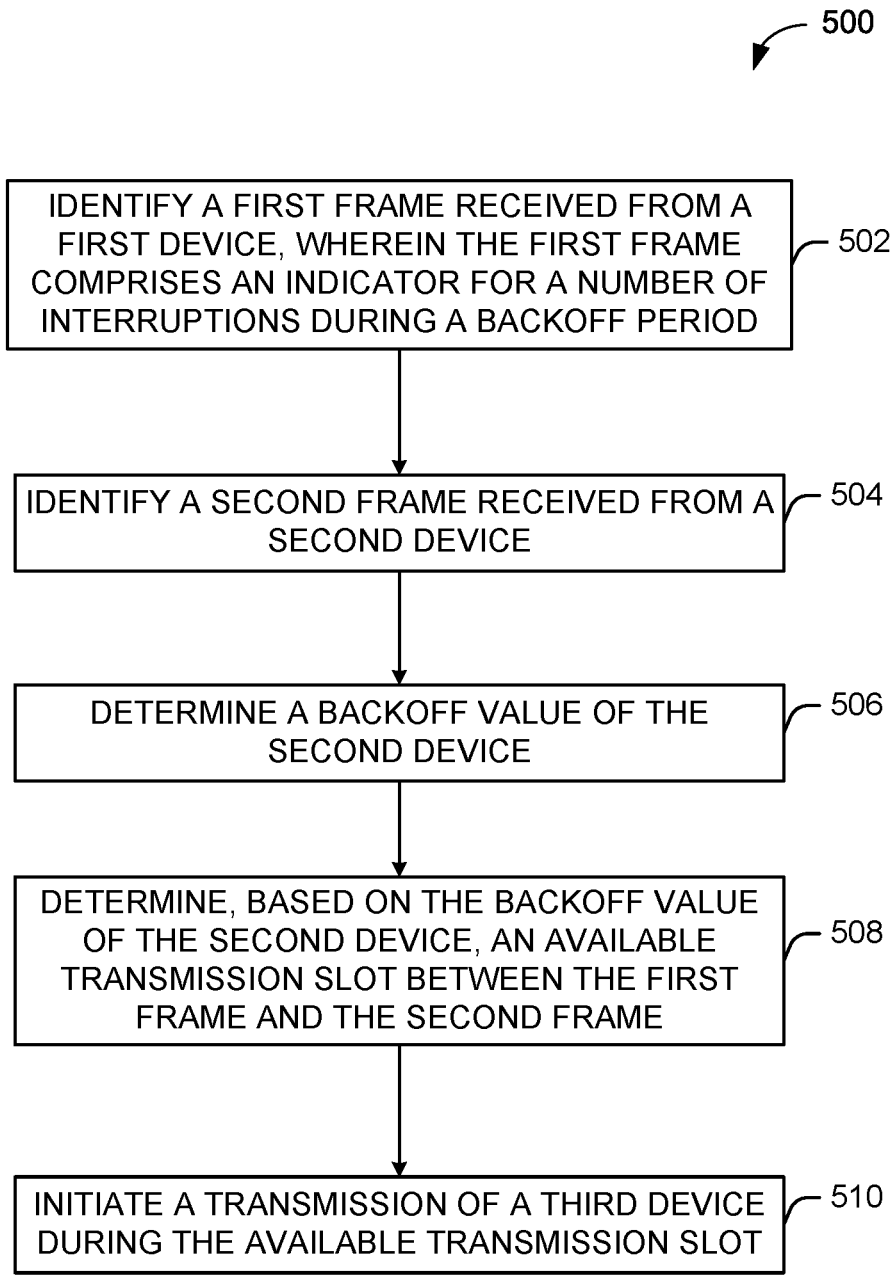
FIG. 5 depicts a flow diagram of illustrative process for providing a deterministic backoff with collision avoidance, in accordance with one or more example embodiments of the present disclosure.

FIG. 5 illustrates a flow diagram of illustrative process 500 for providing a deterministic backoff with collision avoidance, in accordance with one or more example embodiments of the present disclosure.

At block 502, a device may identify a first frame received from a first device. For example, the new station STA4 of FIG. 3 may identify a first frame received from the existing station STA1 of FIG. 3. In one embodiment, the device is a new contender wishing to join a round robin in which the first device is an existing contender. The first frame may or may not be directed to the device (e.g., the device may or may not match the receiving addresses (RA) identified in the first frame). In one embodiment, the first frame is received during a first transmission opportunity of the first device (e.g., the TxOP1 of STA1 of FIG. 3). In one embodiment, the first frame includes an indicator for a number of interruptions during a last backoff period (e.g., during the most recently completed round robin cycle). For example, the indicator can be equal to three, as depicted in FIG. 3 (corresponding to the existing stations STA1, STA2, and STA3).

At block 504, the device may identify a second frame received from a second device. For example, the new station STA4 of FIG. 3 may identify a second frame received from the existing station STA2 of FIG. 3. The second frame may or may not be directed to the device (e.g., the device may or may not match the receiving addresses (RA) identified in the second frame). In one embodiment, the second frame is received during a first transmission opportunity of the second device (e.g., the TxOP2 of STA2 of FIG. 3).

At block 506, the device may determine a backoff value of the second device. For example, the new station STA4 of FIG. 3 may determine a backoff value of the existing station STA2 of FIG. 3. In one embodiment, the device determines a backoff value of the second device at the time of the transmission of the first frame received from the first device. For example, the new station STA4 of FIG. 3 may determine what the backoff value of the existing station STA2 of FIG. 3 was when the first frame was received during the first transmission opportunity TxOP1. The device can determine this backoff value by adding one to the backoff value for each idle slot between the first transmission opportunity and the second transmission opportunity. For example, the STA4 of FIG. 3 can determine that the backoff value of STA2 during the TxOP1 is equal to five by adding four (for the four idle slots) to the backoff value of STA2 immediately prior to the TxOP2 (e.g., when the backoff value of STA2 was equal to one).

At block 508, the device may determine, based on the backoff value of the second device, an empty transmission slot between the first frame and the second frame. For example, the new station STA4 of FIG. 3 may determine, based on the backoff value of STA2 during the TxOP1 being equal to five, that four idle slots are between the TxOP1 of STA1 and the TxOP2 of STA2, corresponding to three available transmission slots (the three available transmission slots associated with the STA2 backoff values of three, two, and one, respectively, as depicted in FIG. 3). In one embodiment, the device may select the soonest available transmission slot. For example, the STA4 may select the available transmission slot associated with the STA2 backoff value of three, as depicted in FIG. 3. In one embodiment, the device may randomly select from the available transmission slots. For example, the STA4 may randomly select the available transmission slot associated with the STA2 backoff value of three, two, or one, respectively, as depicted in FIG. 3.

At block 510, the device may initiate a transmission during the available transmission slot. In one embodiment, the device initiates a transmission during the available transmission slot during the next round robin cycle. For example, the STA 4 of FIG. 3 can initiate a transmission during the available transmission slot between the TxOP1 and the TxOP2 selected at block 508 during the second round robin cycle 312. In this manner, collisions between the STA 4 and the existing stations STA1, STA2, and STA3 are avoided. In one embodiment, after transmitting, the device may reset its backoff according to the deterministic rules and the indicator for the number of interruptions identified at block 502. For example, if the deterministic rule is 10+"i," the STA4 may reset, after transmitting, its backoff value to 13 if the value for "i" is equal to three.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 202 (FIG. 2) or a user device 220 (FIG. 2) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718 (e.g., a speaker), a deterministic backoff device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The deterministic backoff device 719 may carry out or perform any of the operations and processes (e.g., processes 400 and 500) described and shown above. For example, the deterministic backoff device 719 may provide collision avoidance for a round robin having one or more existing contenders and one or more new contenders.

The deterministic backoff device 719 may provide a channel access mechanism that reduces the access delay for APs in a dense environment having multiple basic service sets (BSSs) with a large number of stations and APs.

The deterministic backoff device 719 may provide collision avoidance between existing contenders and new contenders for a shared medium by requiring that any new contender(s) observe a full round robin cycle without decrementing their individual backoffs and without selecting a slot to use for transmission. In this manner, the new contender is able to identify an available transmission slot and the new contender can join the next round robin cycle without causing a collision with any existing contenders.

The deterministic backoff device 719 may observe two consecutive transmissions in two separate TxOPs from the same transmitter (an existing contender). For example, the deterministic backoff device 719 may observe a contender identifier, such as a MAC address, during each TxOP. Once the deterministic backoff device 719 sees the same contender identifier or MAC address repeated during a later TxOP (e.g., 100 milliseconds later), the deterministic backoff device 719 may know that the same existing contender has now accessed the medium twice, and that a full cycle has completed. Moreover, the deterministic backoff device 719 may know that the duration of the current round robin is equal to the duration between successive TxOPs by a particular existing contender.

The deterministic backoff device 719 may, in the case of some contenders having multiple TxOPs per cycle, compare the TxOP durations among the existing contenders. If the TxOP duration of a first existing contender is different (e.g., half, a quarter, etc.) than the TxOP duration of a second existing contender, the deterministic backoff device 719 can ensure that a full round robin cycle has been observed by waiting until all existing contenders have achieved the same total medium access duration (across any number of TxOPs).

The deterministic backoff device 719 may identify the number of backoff interruptions observed between the two successive transmissions in two separate TxOPs by the same existing contender. In this manner the deterministic backoff device 719 may determine the current value of "i" for the round robin. The deterministic backoff device 719 may use the discovered value for "i" to calculate the correct backoff value to use after joining the round robin, according to the deterministic rules.

In embodiments where each frame transmitted during a TxOP includes in a common signaling the current value for "i," the deterministic backoff device 719 may observe this value for "i" to identify the number of existing contenders. For example, if the deterministic backoff device 719 observes a frame from a first existing contender having an "i" value of 6, the deterministic backoff device 719 may observe the round robin until all six existing contenders have transmitted.

In one embodiment, a new contender may count the number of available slots during a round robin cycle. An available slot is defined as the second slot of two consecutive idle slots. The number of available slots (also referred to as empty slots) may be known for a given set of deterministic rules. For example, if the deterministic rules set the backoff to 10+"i," the number of empty slots may always be equal to 9 (there may be 10 idle slots and 9 empty slots by definition).

The deterministic backoff device 719 may identify each of the idle slots during a full round robin cycle. The deterministic backoff device 719 may identify each of the idle slots by observing each TxOP.

For example, the deterministic backoff device 719 may count five idle slots (corresponding to four available slots) between a first existing contender and a second existing contender. During the next round robin, the deterministic backoff device 719 may transmit within one of the four available slots between the first and second existing contenders.

The deterministic backoff device 719 may observe that a first existing contender accesses immediately prior to a second existing contender, without any intervening existing contenders. The deterministic backoff device 719 may also observe the backoff value of the second existing contender once the first existing contender has transmitted (e.g., by observing the number of decrement periods until the second existing contenders transmits). The deterministic backoff device 719 may then determine that it can safely enter the next round robin with an initial backoff that is less than the backoff value of the second existing contender after the first existing contender's TxOP, without causing a collision with any of the existing contenders. Once this backoff value reaches zero, the deterministic backoff device 719 may transmit. After transmitting, the deterministic backoff device 719 may reset the backoff value according to the deterministic rules and the known value for "i."

The deterministic backoff device 719 may attempt to enter the next round robin at the soonest available slot. The deterministic backoff device 719 may randomly select from one of the available slots. The deterministic backoff device 719 may select one of the available slots using a deterministic rule. For example, in one embodiment, the deterministic backoff device 719 forces the next round robin cycle to be entered with a random backoff that is decremented only in idle slots.

The deterministic backoff device 719 may ensure QoS differentiation by providing a way for some devices to access the medium multiple times per cycle without negatively affecting the total access duration of the other existing contenders, and without causing new collisions.

The deterministic backoff device 719 may define a TxOP duration that is fixed for a basic access category (a single access per cycle). Every device that accesses the medium with the basic access category may have a TxOP duration that does not exceed a fixed maximum TxOP duration (also referred to as a basic TxOP). For example, the fixed maximum TxOP duration can be 4 seconds, 6 seconds, 10 seconds, or any other desired TxOP duration.

The deterministic backoff device 719 may adjust the calculation for "i" and the backoff value to ensure that overall, the duration of the round robin cycle may not change and the total duration of access to the medium by the other devices is not reduced.

The deterministic backoff device 719 may, in exchange for seeking additional accesses to the medium per round robin cycle, reduce its backoff proportionally. To reduce the backoff proportionally, the deterministic backoff device 719 may calculate a new value for "i." For example, the deterministic backoff device 719 may desire four access times in one round robin. In this scenario, the deterministic backoff device 719 may calculate "i" over four backoff decrement intervals (meaning for four accesses to the medium with backoff reaching zero). Each of these accesses may be for a duration equal to one fourth of the basic TxOP. This way, all other STAs may experience the same access delay, and fairness may be maintained.

In some embodiments, as in the example above, the result of the new backoff decrement is not an integer. In this scenario, the deterministic backoff device 719 may generate different backoff integers that, summed over an entire round robin, may be equal to the backoff of the other contenders.

The deterministic backoff device 719 may select these new backoffs to ensure that each backoff may not generate any collisions with an existing contender observed in the last round robin cycle. For example, a backoff value may not be selected if it is known to be a value that may cause a collision with an existing contender. The selection of these backoff values should also be made in order to allow stability over multiple round robins.

It is understood that the above are only a subset of what the deterministic backoff device 719 may be configured to perform and that other functions included throughout this disclosure may also be performed by the deterministic backoff device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device, the device comprising storage and processing circuitry configured to: identify a first transmission received from a first device, wherein the first transmission is over a shared access medium; identify a second transmission received from the first device, wherein the second transmission is over the shared access medium; determine an available transmission slot between the first transmission and the second transmission; and transmit, during the available transmission slot, a third transmission from the device.

Example 2 may include the device of example 1 and/or some other example herein, wherein the storage and the processing circuitry are further configured to identify a number of interruptions between the first transmission and the second transmission.

Example 3 may include the device of example 2 and/or some other example herein, wherein the storage and the processing circuitry are further configured to determine, based on the number of interruptions, a backoff value for the device.

Example 4 may include the device of example 3 and/or some other example herein, wherein the storage and the processing circuitry are further configured to set, after the third transmission, a next backoff value of the device based on the backoff value.

Example 5 may include the device of example 1 and/or some other example herein, wherein identifying an available transmission slot comprises: identifying a plurality of available transmission slots; and selecting a first available transmission slot.

Example 6 may include the device of example 5 and/or some other example herein, wherein the first available transmission slot is selected randomly.

Example 7 may include the device of example 1 and/or some other example herein, wherein the first transmission is associated with a first transmission opportunity of the first device and the second transmission is associated with a second transmission opportunity of the first device.

Example 8 may include the device of example 1 and/or some other example herein, wherein the shared access medium is associated with a plurality of devices, and wherein the plurality of devices share the access medium according to a round robin access scheme.

Example 9 may include the device of any one of examples 1 to 8 and/or some other example herein, wherein the storage and the processing circuitry are further configured to: identify a maximum transmission duration; determine a number of additional transmissions of the device required between the first transmission and the second transmission; and determine, based on the number of additional transmissions and the maximum transmission duration, a transmission duration for each of the additional transmissions.

Example 10 may include the device of example 1 and/or some other example herein, wherein further comprising a transceiver configured to transmit and receive wireless signals.

Example 11 may include the device of example 10 and/or some other example herein, further comprising an antenna coupled to the transceiver.

Example 12 may include a non-transitory computer-readable medium storing computer-executable instructions which when executed by one or more processors result in performing operations comprising: identifying a first frame received from a first device, wherein the first frame comprises an indicator for a number of interruptions during a backoff period; identifying a second frame received from a second device; determining a backoff value of the second device; determining, based on the backoff value of the second device, an available transmission slot between the first frame and the second frame; and initiating a transmission of a third device during the available transmission slot.

Example 13 may include the non-transitory computer-readable medium of example 12 and/or some other example herein, wherein identifying a backoff value of the second device further comprises identifying a number of backoff decrements between the first frame and the second frame.

Example 14 may include the non-transitory computer-readable medium of example 12 and/or some other example herein, wherein the first frame is received during a first transmission opportunity of the first device and the second frame is received during a first transmission opportunity of the second device.

Example 15 may include the non-transitory computer-readable medium of example 12 and/or some other example herein, wherein determining a backoff value of the second device comprises determining a backoff value of the second device at a time of receiving the first frame from the first device.

Example 16 may include the non-transitory computer-readable medium of any one of examples 12 to 15 and/or some other example herein, wherein the one or more processors result in performing operations further comprising: determining, based on the indicator of the first frame, a backoff value for the third device.

Example 17 may include a method comprising: identifying, by one or more processors, a first transmission from a first device, wherein the first transmission is over a shared access medium; identifying a second transmission from the first device, wherein the second transmission is over the shared access medium; identifying an available transmission slot between the first transmission and the second transmission; and transmitting, during the available transmission slot, a third transmission from the device.

Example 18 may include the method of example 17 and/or some other example herein, further comprising identifying a number of backoff interruptions between the first transmission and the second transmission.

Example 19 may include the method of example 18 and/or some other example herein, further comprising determining, based on the number of backoff interruptions, a backoff value for the device.

Example 20 may include the method of example 19 and/or some other example herein, further comprising setting, after the third transmission, a backoff of the device equal to the backoff value.

Example 21 may include the method of example 17 and/or some other example herein, wherein identifying an available transmission slot comprises: identifying a plurality of available transmission slots; and selecting a first available transmission slot.

Example 22 may include the method of any one of examples 17 to 21 and/or some other example herein, further comprising: identifying a maximum transmission duration; determining a number of additional transmissions of the device required between the first transmission and the second transmission; and determining, based on the number of additional transmissions and the maximum transmission duration, a transmission duration for each of the additional transmissions.

Example 23 may include an apparatus comprising means for: identifying a first frame received from a first device, wherein the first frame comprises an indicator for a number of interruptions during a backoff period; identifying a second frame received from a second device; identifying a backoff value of the second device; determining, based on the backoff value of the second device, an available transmission slot between the first frame and the second frame; and initiating a transmission of a third device during the available transmission slot.

Example 24 may include the apparatus of example 23 and/or some other example herein, wherein identifying a backoff value of the second device further comprises identifying a number of backoff decrements between the first frame and the second frame.

Example 25 may include the apparatus of any one of examples 23 to 24 and/or some other example herein, further comprising determining, based on the indicator of the first frame, a backoff for the third device.

Example 26 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 27 may include an apparatus comprising logic, modules, and/or circuitry to perform one or more elements of a method described in or related to any of examples 1-25, or any other method or process described herein.

Example 28 may include a method, technique, or process as described in or related to any of examples 1-25, or portions or parts thereof.

Example 29 may include an apparatus comprising: one or more processors and one or more computer readable media comprising instructions that, when executed by the one or more processors, cause the one or more processors to perform the method, techniques, or process as described in or related to any of examples 1-25, or portions thereof.

Example 30 may include a method of communicating in a wireless network as shown and described herein.

Example 31 may include a system for providing wireless communication as shown and described herein.

Example 32 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising storage and processing circuitry configured to:
    identify a first transmission received from a first device, wherein the first transmission is over a shared access medium;
    identify a second transmission received from the first device, wherein the second transmission is over the shared access medium;
    determine an available transmission slot between the first transmission and the second transmission; and
    transmit, during the available transmission slot, a third transmission from the device;
    identify a number of interruptions between the first transmission and the second transmission;
    determine, based on the number of interruptions, a backoff value for the device; and
    set, after the third transmission, a next backoff value of the device based on the backoff value.

2. The device of claim 1, wherein identifying an available transmission slot comprises:
    identifying a plurality of available transmission slots; and
    selecting a first available transmission slot.

3. The device of claim 2, wherein the first available transmission slot is selected randomly.

4. The device of claim 1, wherein the first transmission is associated with a first transmission opportunity of the first device and the second transmission is associated with a second transmission opportunity of the first device.

5. The device of claim 1, wherein the shared access medium is associated with a plurality of devices, and wherein the plurality of devices share the access medium according to a round robin access scheme.

6. The device of claim 1, wherein the storage and the processing circuitry are further configured to:
    identify a maximum transmission duration;
    determine a number of additional transmissions of the device required between the first transmission and the second transmission; and determine, based on the number of additional transmissions and the maximum transmission duration, a transmission duration for each of the additional transmissions.

7. The device of claim 1, further comprising a transceiver configured to transmit and receive wireless signals.

8. The device of claim 7, further comprising an antenna coupled to the transceiver.

9. A non-transitory computer-readable medium storing computer-executable instructions which when executed by one or more processors result in performing operations comprising:
 identifying a first frame received from a first device, wherein the first frame comprises an indicator for a number of interruptions during a backoff period;
 identifying a second frame received from a second device;
 determining a backoff value of the second device;
 determining, based on the backoff value of the second device, an available transmission slot between the first frame and the second frame; and
 initiating a transmission of a third device during the available transmission slot.

10. The non-transitory computer-readable medium of claim 9, wherein identifying a backoff value of the second device further comprises identifying a number of backoff decrements between the first frame and the second frame.

11. The non-transitory computer-readable medium of claim 9, wherein the first frame is received during a first transmission opportunity of the first device and the second frame is received during a first transmission opportunity of the second device.

12. The non-transitory computer-readable medium of claim 9, wherein determining a backoff value of the second device comprises determining a backoff value of the second device at a time of receiving the first frame from the first device.

13. The non-transitory computer-readable medium of claim 9, wherein the one or more processors result in performing operations further comprising:
 determining, based on the indicator of the first frame, a backoff value for the third device.

14. A method comprising:
 identifying, by one or more processors, a first transmission from a first device, wherein the first transmission is over a shared access medium;
 identifying a second transmission from the first device, wherein the second transmission is over the shared access medium;
 identifying an available transmission slot between the first transmission and the second transmission; and
 transmitting, during the available transmission slot, a third transmission from the device;
 identifying a number of backoff interruptions between the first transmission and the second transmission;
 determining, based on the number of backoff interruptions, a backoff value for the device; and
 setting, after the third transmission, a backoff of the device equal to the backoff value.

\* \* \* \* \*